D. M. MEFFORD.
Apparatus for Treating Cider, Wine, and other Liquors with Sulphurous Acid.
No. 134,389. Patented Dec. 31, 1872.
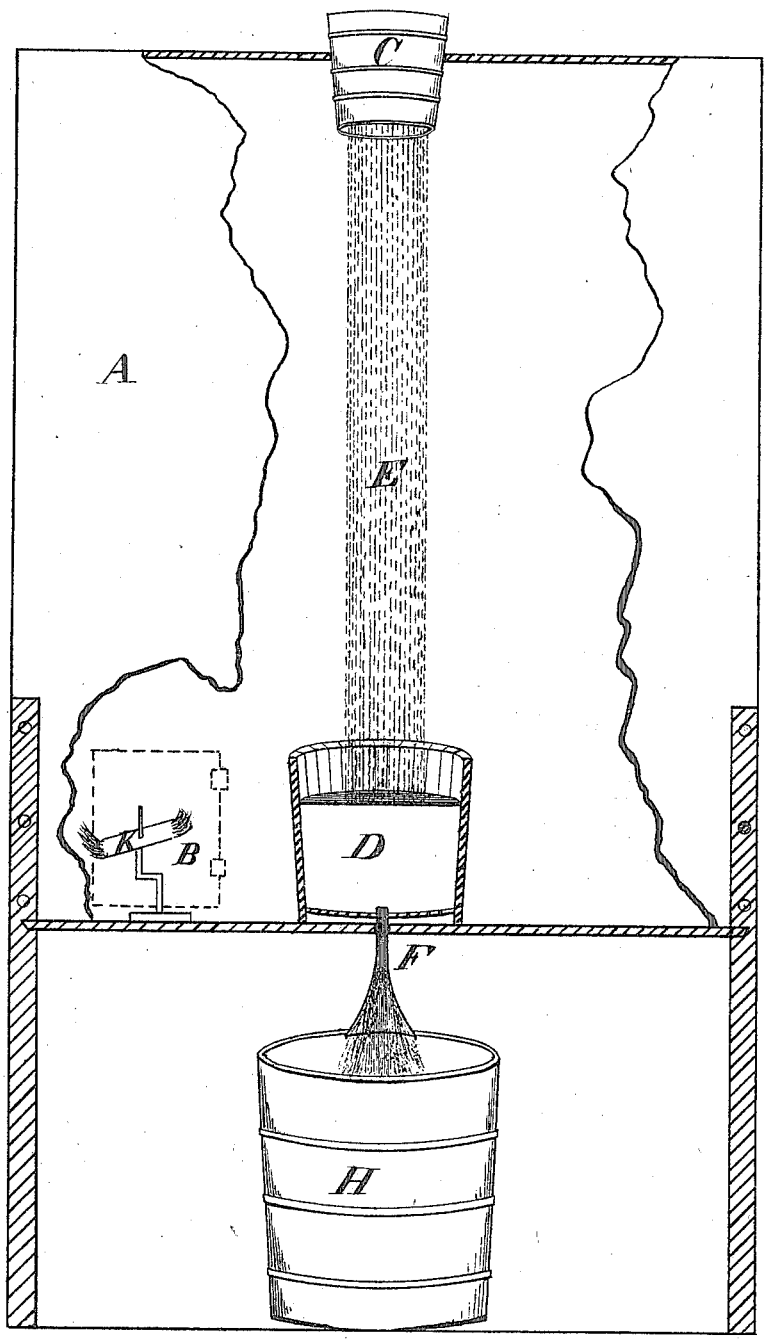

UNITED STATES PATENT OFFICE.

DAVID M. MEFFORD, OF HURON COUNTY, OHIO.

IMPROVEMENT IN APPARATUS FOR TREATING CIDER, WINE, AND OTHER LIQUIDS WITH SULPHUROUS ACID.

Specification forming part of Letters Patent No. 134,389, dated December 31, 1872.

*To all whom it may concern:*

Be it known that I, DAVID M. MEFFORD, of the county of Huron, in the State of Ohio, have invented a new and useful apparatus for the treatment of cider, wine, the must of grapes, and the juices of other fruits and vegetables with sulphurous-acid gas for antiseptic purposes; and I hereby declare the following to be a full and exact description thereof, reference being had to the drawing accompanying this application and the letters of reference marked thereon and made a part of this specification.

The nature of my invention consists in pouring or showering cider, wine, the must of grapes, and the juices of other fruits and vegetables through a receiver or chamber charged with sulphurous-acid gas, thereby securing instantaneous and uniform absorption of said gas to a sufficient extent to prevent fermentation.

To enable others skilled in the art to make and use my appatatus, I will proceed to describe it and the manner of using it.

In the accompanying drawing, A is a close receiver thrown open to show the interior arrangement. B is a door into the receiver through which the sulphur match K is introduced. C is a vessel with a perforated bottom nicely fitted upon or let into the top of receiver. D is a tub fixed perpendicularly under the vessel C, and which has the tube F inserted into its bottom, which also passes through the bottom of receiver for the purpose of discharging the liquid into the tub H.

All things being thus constructed and arranged, the sulphur match K is ignited and put into the receiver through the door B and the door closed; the liquid for treatment is then poured into the vessel C, and, streaming through the perforated bottom of that vessel, descends in a shower, marked E, absorbing the gas which fills the receiver, and is caught in the tub D, and, running out through the pipe or tube F, is caught in the tub H.

*Claim.*

What I claim as new, of my invention, and desire to secure by Letters Patent, is—

The pouring or showering of cider, wine, the must of grapes, or the juices of other fruits and vegetables through a medium or chamber charged with sulphurous-acid gas for antiseptic purposes, substantially as set forth in the foregoing specification.

DAVID M. MEFFORD.

Witnesses:
   HENRY I. COE,
   A. DE BOLT.